May 27, 1958   J. SINDEL   2,836,643
GALVANIC BATTERY
Filed Aug. 30, 1955

INVENTOR:
J. Sindel
BY
Richard y Geier
ATTORNEYS

2,836,643
GALVANIC BATTERY

Johann Sindel, Ellwangen, Jagst, Germany, assignor to Pertrix-Union G. m. b. H., Ellwangen, Jagst, Germany Application August 30, 1955, Serial No. 531,332

Claims priority, application Germany August 30, 1954

1 Claim. (Cl. 136—111)

This invention relates to a galvanic battery and refers more particularly to a battery composed of a pile of flat, plate-like cells.

The galvanic batteries of this type consist of superposed flat cells provided with central openings. These cells have the drawback that if the casing is slightly uneven the electrolite located in the casing can move sidewise through the lower opening of the casing between the conducting layer and the bottom of the casing.

An object of the present invention is to eliminate these drawbacks of prior constructions and to provide a battery consisting of a pile of superposed flat cells, the contents of which will remain securely in place, and which will operate efficiently for lengthy time periods.

Other objects of the present invention will become apparent in the course of the following specification.

In accomplishing the objects of the present invention it was found desirable to provide cells, the lower casings of which are so constructed that the conducting foil will be pressed against the edges of the central opening in the lower casing. This firm connection between the edges of the opening and the foil will prevent the foil from being pushed out of the casing through the opening. The connection between the opening and the foil may be established by the provision of ridges or grooves in the casing which surround the central opening. Furthermore, instead of a single foil located within the casing two or three foils may be provided, some of which are located outside of the casing and are connected with the foil within the casing.

The invention will appear more clearly from the following detailed description when taken in connection with the accompanying drawing showing by way of example only, preferred embodiments of the inventive idea.

Figure 1:
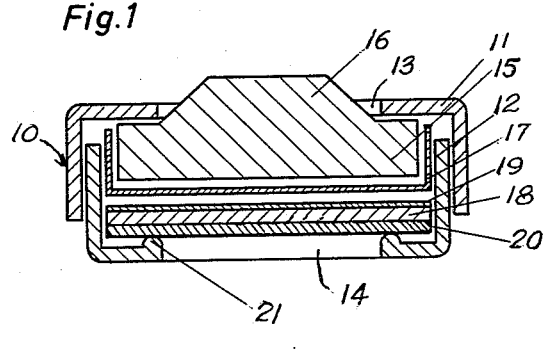
Figure 1 is a section through a plate-like cell constructed in accordance with the principles of the present invention, some of the parts being shown separated from each other for the sake of clarity.

Figure 1 illustrates a cell 10 which forms a part of a galvanic battery. The cell 10 has an upper casing 11 which fits over a lower casing 12. The casings 11 and 12 are made of an insulating plastic material. The upper casing 11 has a central opening 13 and the lower casing 12 has a central opening 14.

The casings 11 and 12 contain a depolarizer pressing 15 provided with a projection 16 which extends through the opening 13. The usual bent paper sheet 17 encloses the lower portion of the depolarizer pressing 15. A zinc sheet 18 is located within the casing 12 and carries upon its upper surface an electrolite carrier 19 which is pasted thereon. A conducting foil 20 is firmly connected with the underside of the zinc sheet 18 by pressure rollers or the like.

In accordance with the present invention any danger that the electrolite will be pushed out of the casing 12 through the opening 14 is effectively avoided through the provision of a bead, crest or ridge 21, which surrounds the opening 14 and is directed toward the interior of the casing 12.

It is apparent that when the cell 10 is assembled, and when several of these cells are arranged to form a battery, the ridge 21 will press into the conducting foil 20 and form an effective seal preventing the foil from being pushed out of the opening 14.

It is apparent that the ridge 21 can be conveniently replaced by grooves, ribs, series of small projections or the like.

Figure 2:
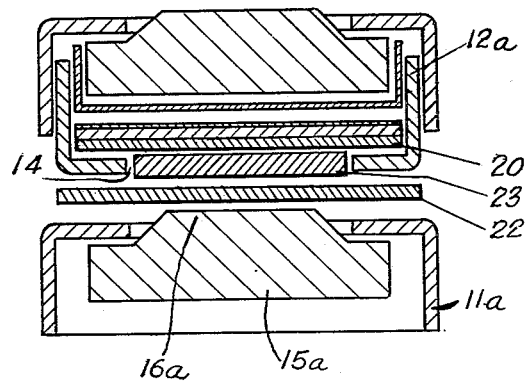
Figure 2 is a section through a somewhat differently constructed galvanic battery, whereby only a part of the second cell has been shown for the sake of clarity.

Figure 2 illustrates a different construction wherein a second conducting foil 22 is located between the lower casing 12a of one cell and the upper casing 11a of an underlying cell. The conducting foil 22 has approximately the outline of the lower casing 12a.

A third foil 23 is fitted into the opening 14 of the lower casing 12a and fits within that opening. Preferably the foil 23 is somewhat thicker than the walls of the casing 12a so as to provide a secure and perfect closure when the foil 23 is stretched as the individual cells are being pressed one against the other.

The foil 23 and that side of the foil 22 which is directed toward the foil 23 can be coated with a solvent such as trichlorethylene, so as to provide a secure connection between foils 23 and 22.

It is apparent that the examples shown above have been given solely by way of illustration and not by way of limitation, and that they are subject to many variations and modifications within the scope of the present invention. All such variations and modifications are to be included within the scope of the invention.

What is claimed is:

In a galvanic battery, a plate-like cell comprising a lower casing, an upper casing over said lower casing, an electrode within said casings, and a conducting foil firmly connected with the underside of said electrode, said lower casing having formed therein a central opening and an annular ridge enclosing said opening and pressing against said conducting foil.

References Cited in the file of this patent

UNITED STATES PATENTS

| 2,519,054 | Woodring | Aug. 15, 1950 |
| 2,594,047 | Martinez | Apr. 22, 1952 |
| 2,672,498 | Temple | Mar. 16, 1954 |

FOREIGN PATENTS

| 517,301 | Belgium | Feb. 14, 1953 |